Feb. 18, 1941. M. A. DREWS 2,232,374
DRILL JIG
Filed Jan. 8, 1940 2 Sheets-Sheet 1

Inventor
M. A. Drews

By

Attorneys

Feb. 18, 1941.　　　M. A. DREWS　　　2,232,374
DRILL JIG
Filed Jan. 8, 1940　　　2 Sheets-Sheet 2
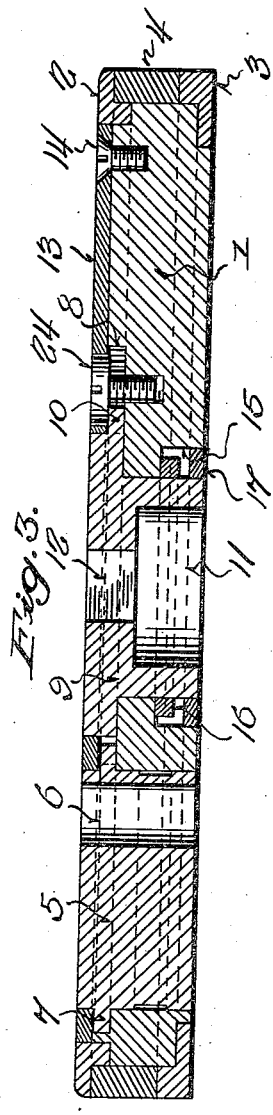
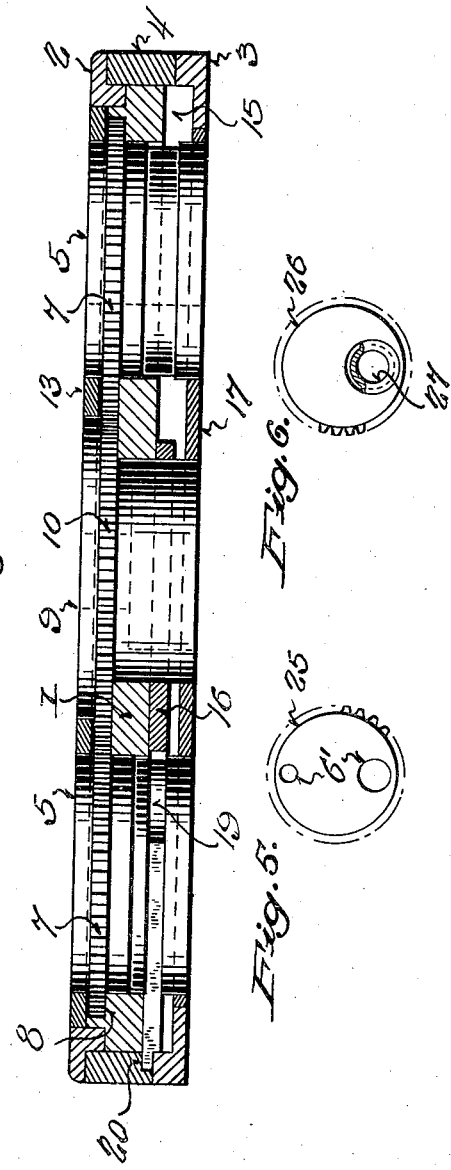
Inventor
M.A.Drews
By
Attorneys Patented Feb. 18, 1941

2,232,374

UNITED STATES PATENT OFFICE 2,232,374

DRILL JIG

Maximillian A. Drews, Milwaukee, Wis.

Application January 8, 1940, Serial No. 312,956

9 Claims. (Cl. 77—62)

This invention pertains to drill jigs, and more particularly to an adjustable jig for multiple drill presses.

At the present time it is customary in machine shop practice to make up special drill jigs for each job requiring different drill centers. The cost of such jigs necessitates a considerable investment, and, in many instances, they are used only on a single job.

It is, therefore, the primary object of the present invention to provide an adjustable drill jig for multiple drill presses, which may be readily set for various drill centers within certain range limits.

Incidental to the foregoing, a more specific object of the invention resides in the provision of a drill jig having a plurality of radially adjustable drill guides.

A further object resides in the provision of means for simultaneously effecting radial adjustment of the drill guides.

Another object is to provide a jig having rotatably adjustable guides provided with eccentric drill openings, and actuated by a common manually operable mechanism.

A still further object is to provide means operable upon adjustment of the drill guides for indicating the circumferential relation of the guide openings to the jig.

With the above and other objects in view, which will appear as the description proceeds, the invention resides in the novel construction, combination, and arrangement of parts, substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings:

Figure 3 is a transverse section taken on the line 3—3 of Figure 1;

Figure 4 is a similar section taken on the line 4—4 of Figure 2; and

Figures 5 and 6 are plan views of modified forms of guide blocks.

Figure 1:
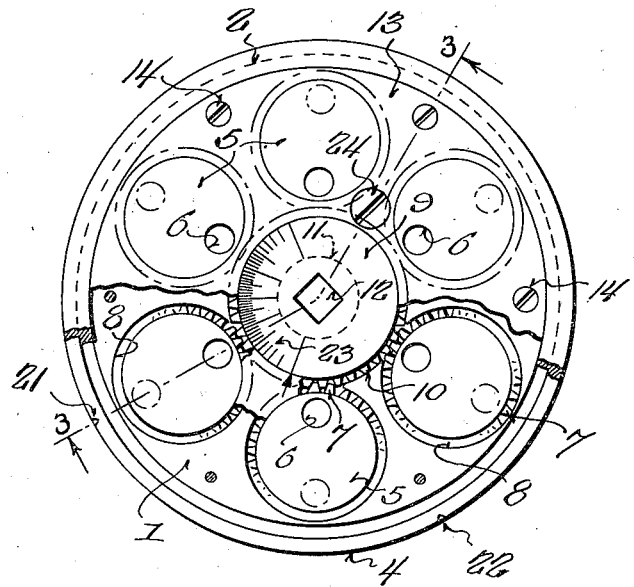
Figure 1 is a top plan view of a jig constructed in accordance with one form of the present invention, parts being broken away and in section to more clearly illustrate structural details.

Referring now more particularly to the accompanying drawings, the jig illustrated comprises a flat circular body designated by the numeral 1, and having secured upon its upper and lower faces in any suitable manner, such as a press fit, peripheral flanges 2 and 3, respectively. Positioned between the flanges 2 and 3, and rotatable on the periphery of the circular body 1, is an indicating ring 4, the purpose of which will be later explained.

Rotatably journaled within the body 1 is a plurality of circumferentially spaced guide blocks 5, concentric with the center of the jig and each provided with eccentric drill openings 6. Each guide block is provided with external gear teeth 7, which rotate in annular recesses 8 formed in the top face of the body 1.

Also journaled centrally in the body 1 is a flanged sleeve 9, provided with external gear teeth 10 meshing with the teeth 7 of the guide blocks. The lower end of the sleeve is provided with an annular recess 11 for reception of a plug in centering the jig on the work, while the upper end of the sleeve is provided with a squared opening 12 for reception of a suitable tool employed for rotating the sleeve during adjustment of the guide blocks, it being obvious that upon rotation of the sleeve 9, through its gear connection with the guide blocks 5, the latter will be rotated to radially shift the drill openings 6 with relation to the center of the jig.

A suitable closure plate 13, secured to the top face of the body by screws 14, serves to secure the blocks in the body, as well as to retain lubricant and exclude dust and metal particles.

Inasmuch as rotatable adjustment of the guide blocks 5 naturally shifts the drill openings circumferentially, as well as radially with relation to the body, it is essential to provide indicating means to enable the operator to determine the exact position of the centers in applying the jig to the work.

To accomplish the foregoing, the lower face of the body 1 is provided with a transverse recess 15, in which an arm 16 is positioned. A plate 17, secured to the bottom face of the body by screws 18, serves to close the recess.

Figure 2:
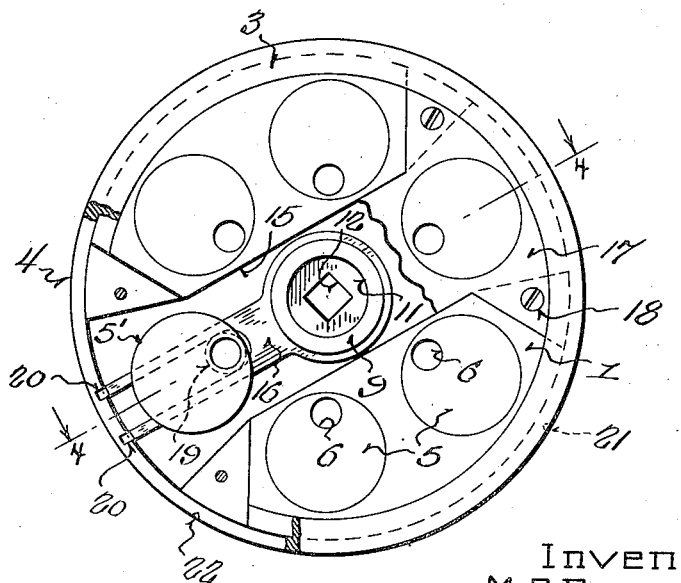
Figure 2 is a bottom plan view, with parts broken away.
Figure 2:

As best shown in Figures 2 and 4, the arm 16 is journaled on the lower end of the sleeve 9, and is bifurcated at its outer end for reception of a boss 19 formed in one of the guide blocks 5', concentric to the drill opening 6 formed in the guide block. The bifurcated ends of the arm 16 project into notches 20 formed in the inner periphery of the indicating ring 4.

It will, therefore, be apparent that as the block 5' is rotated, the boss 19 will impart rotary movement to the arm with relation to the body, thus causing the indicator ring to be shifted in fixed circumferential relation to the drill opening 6.

As indicated in Figures 1 and 2, the outer periphery of the ring 4 is provided with notches, or other indicating marks 21 and 22, respectively, the notch 21 indicating the center line of the drill opening, while the notch 22 indicates the center line between the drill openings should it be desired to straddle the center line on the work, thus materially facilitating proper setting of the jig on the work.

From the foregoing explanation, considered in connection with the accompanying drawings, it is thought that the operation of the invention will be readily apparent, in that to radially vary the spacing of the drill openings 6, it is merely necessary to rotate the sleeve 9 by means of any suitable tool. Any desired arrangement of graduations 23 may be provided on the sleeve, corresponding to a suitable chart (not shown), thus enabling the operator to select or determine the spacing between centers required.

For the purpose of locking the guide blocks 5 in adjusted position, a set screw 24 is threaded into the body, while its head engages the gear teeth 10 of the sleeve 9, and the teeth 7 on the adjacent blocks 5, to frictionally bind the same against the body and prevent accidental shifting.

While the jig illustrated is provided with six guide blocks, it is to be understood that any number of blocks may be employed, and when the number is an even multiple, any divisional number of holes may be drilled with the same jig, or even multiples of the number of the centers may be drilled by shifting the jig on the work.

In addition to the foregoing, drill openings of different sizes are frequently required, and, therefore, should it be desired to extend the range of work to be accommodated by the jig, guide blocks, such as shown in Figures 5 and 6, may be employed. In Figure 5, the block 25 is provided with two drill openings 6' of different dimensions, while the guide block 26 shown in Figure 6 is equipped with a removable bushing 27, and any number of these may be provided to accommodate different sized drills.

From the foregoing, it will be readily appreciated that a highly novel structure of chuck has been provided, which may be readily adjusted to accommodate a wide range of drill centers and different sizes of drills, thus eliminating the necessity of a great multiplicity of chucks for specific jobs.

Also, while the invention has been illustrated and described in connection with drill presses, it is to be understood that the principles embodied therein may be applied to other machine tools without departing from the invention.

I claim:

1. A drill jig comprising, a body, a plurality of annularly spaced drill guides adjustably mounted in said body for radially varying the spacing of the drill centers, and manually operable means for simultaneously adjusting said guides.

2. A drill jig comprising, a body, a plurality of annularly spaced drill guides rotatably adjustable in said body for varying the spacing of the drill centers, and manually operable means for simultaneously rotating said guides.

3. A drill jig comprising, a body, a plurality of annularly spaced drill guides rotatably adjustable in said body for radially varying the spacing of the drill centers, and means operable upon adjustment of the guides for indicating the circumferential position of the drill centers with relation to the body.

4. A drill jig comprising, a body, a plurality of annularly spaced drill guides adjustably mounted in said body for radially varying the spacing of the drill centers, manually operable means for simultaneously adjusting said guides, and means actuated by said manually operable means for indicating the circumferential position of the drill centers with relation to the body.

5. A drill jig comprising a circular body, a plurality of annularly spaced drill guides rotatably adjustable in said body for radially varying the spacing of the drill centers, manually operable means for simultaneously rotating said guides, a ring provided with an indication rotatably mounted upon the periphery of said body, and means actuated by said manually operable means for shifting said ring to indicate the circumferential position of the guides with relation to the body.

6. A drill jig comprising, a circular body, a plurality of annularly spaced circular drill blocks rotatably mounted in said body and provided with eccentric drill openings, a manually rotatable adjusting sleeve mounted in said body concentric to said guide blocks, and gear connections between said sleeve and guide blocks for simultaneously rotating all of said blocks upon rotation of said sleeve for radially varying the spacing of the drill openings.

7. A drill jig comprising, a circular body, a plurality of annularly spaced circular drill blocks rotatably mounted in said body and provided with eccentric drill openings, a manually rotatable adjusting sleeve mounted in said body concentric to said guide blocks, gear connections between said sleeve and guide blocks for simultaneously rotating all of said blocks upon rotation of said sleeve for radially varying the spacing of the drill openings, and means actuated by said adjusting sleeve for indicating the circumferential position of said drill openings with relation to the body.

8. A drill jig comprising, a circular body, a plurality of annularly spaced circular drill blocks rotatably mounted in said body and provided with eccentric drill openings, a manually rotatable adjusting sleeve mounted in said body concentric to said guide blocks, gear connections between said sleeve and guide blocks for simultaneously rotating all of said blocks upon rotation of said sleeve for radially varying the spacing of the drill openings, a ring provided with an indication rotatably mounted upon the periphery of said body, and means actuated by said adjusting sleeve for shifting said ring to indicate the circumferential position of said drill openings with relation to the body.

9. A drill jig comprising, a circular body, a plurality of annularly spaced circular drill blocks rotatably mounted in said body and provided with eccentric drill openings, a manually rotatable adjusting sleeve mounted in said body concentric to said guide blocks, gear connections between said sleeve and guide blocks for simultaneously rotating all of said blocks upon rotation of said sleeve for radially varying the spacing of the drill openings, a ring provided with an indication rotatably mounted upon the periphery of said body, an arm rotatably journaled upon said sleeve and engaging said ring, and means carried by one of the guide blocks for oscillating said arm to shift said ring for indicating the circumferential position of said guide openings with relation to said body.

MAXIMILLIAN A. DREWS.